United States Patent [19]
Baney

[11] Patent Number: 6,014,480
[45] Date of Patent: Jan. 11, 2000

[54] OPTICAL ENERGY SELECTOR APPARATUS AND METHOD

[75] Inventor: Douglas M. Baney, Los Altos, Calif.

[73] Assignee: Hewlett-Packard Company, Palo Alto, Calif.

[21] Appl. No.: 08/976,187

[22] Filed: Nov. 21, 1997

[51] Int. Cl.[7] .................................................. G02B 6/28
[52] U.S. Cl. ................. 385/24; 385/37; 385/46
[58] Field of Search ............................. 359/130; 385/46, 385/24, 37, 15, 10

[56] References Cited

U.S. PATENT DOCUMENTS

| | | | |
|---|---|---|---|
| 5,434,937 | 7/1995 | Glance | 385/24 |
| 5,446,809 | 8/1995 | Fritz et al. | 385/24 |
| 5,457,760 | 10/1995 | Mizrahi | 385/37 |
| 5,469,288 | 11/1995 | Onaka et al. | 359/189 |
| 5,600,473 | 2/1997 | Huber | 359/130 |
| 5,673,129 | 9/1997 | Mizrahi | 359/130 |
| 5,699,468 | 12/1997 | Farries et al. | 385/140 |

*Primary Examiner*—Hung N. Ngo

[57] ABSTRACT

A channel selection method and apparatus accommodate the dynamic reconfiguration of channels that are passed through parallel waveguides by selectively tuning Bragg gratings along the waveguides. In the preferred embodiment, the waveguides are output optical fibers connected to an optical splitter having an input of a wavelength division multiplexed (WDM) optical signal. The number of channels in the WDM signal is equal to the number of output fibers, which is in turn equal to the number of tunable Bragg gratings along each of the output fibers. The series of Bragg gratings on a particular output fiber is structurally identical to the other series, with each tunable Bragg grating being dedicated to passing or rejecting one of the channels of the WDM signal. Thus, the series of Bragg gratings along a particular output fiber may be tuned to isolate any of the channels or may be tuned to pass two or more channels. In addition to use in a demultiplexing application, the method and apparatus may be used in a multiplexing application to enable channel selection along each of a number of different input waveguides.

10 Claims, 5 Drawing Sheets

OPTICAL ENERGY SELECTOR APPARATUS AND METHOD

TECHNICAL FIELD

The invention relates generally to wavelength division multiplexing and more particularly to adjustable multiplexers and adjustable demultiplexers.

BACKGROUND ART

Lightwave networks may be used to rapidly transfer information among remote sites via optical signals that are transmitted through waveguides, such as optical fibers. In lightwave communications, data may be sent as an encoded optical signal with a known wavelength. The bandwidth of lightwave data that is transmitted through an optical fiber as a single optical signal is limited. Consequently, wavelength division multiplexing is performed to increase the transfer capacity of the optical fiber. Wavelength division multiplexing is the simultaneous transmission of multiple channels along an optical waveguide, with the channels being signals having different wavelengths. Typical wavelength division multiplexed optical signals include four, eight, sixteen or thirty-two channels. Each channel is also referred to as an optical carrier.

While wavelength division multiplexing allows the simultaneous transmission of multiple channels along a single optical fiber, it requires the multiplexed optical signal to be separated by wavelength at the receiving site, so that the individual channels can be distributed as needed. The separation of the multiplexed optical signal by wavelength is referred to as demultiplexing, which is often performed by Bragg gratings along one or more waveguides at the receiving site. As is well known, Bragg gratings are elements that establish periodic changes in refractive index, and the periodicity may be selected to correspond to a target wavelength in order to reflect a channel comprised of an optical signal having that wavelength.

One known configuration of a device for demultiplexing a wavelength division multiplexed optical signal is described in U.S. Pat. No. 5,457,760 to Mizrahi. An embodiment of the Mizrahi device is illustrated in FIG. 1. A demultiplexer 10 includes a coupling member 12 having an input fiber 14 and having eight output fibers 16, 18, 20, 22, 24, 26, 28 and 30. Each output waveguide includes seven of eight different wavelength-selective optical filtering elements 32, 34, 36, 38, 40, 42, 44 and 46. Typically, the filtering elements are fixed Bragg gratings. The eight different Bragg gratings are distinguishable with respect to the target wavelength. In FIG. 1, the eight different types of Bragg gratings are organized by target wavelengths into eight columns. Each one of the eight output waveguides 16–30 has a missing type of Bragg grating. For example, output waveguide 30 has Bragg gratings 34–46, but is missing Bragg grating 32. Thus, the output waveguide 30 will pass a channel having a wavelength that corresponds to the target wavelength of Bragg grating-type 32, but will reject the seven channels having wavelengths that correspond to the target wavelengths of Bragg grating-types 34–46.

In operation, the input fiber 14 of the demultiplexer 10 of FIG. 1 is connected to a source of a wavelength division multiplexed optical signal having eight channels, i.e., optical carriers. The wavelengths of the eight channels correspond to the target wavelengths of the eight types of fixed Bragg gratings 32–46. The eight-channel wavelength division multiplexed optical signal from the input fiber 14 is split into eight lower energy signals that are introduced into the eight output waveguides 16–30. The configuration of Bragg gratings along a particular output waveguide determines which of the eight channels will reach the end of the output waveguide opposite to the coupling member 12. Stated in the negative, the optical channel that is not reflected during propagation through a particular output waveguide is determined by which one of the eight alternative fixed Bragg gratings is missing from that output waveguide. As a result of the operation of the demultiplexer 10, the eight channels are isolated from each other at the ends of the output waveguide.

Isolating channels using devices such as the demultiplexer of Mizrahi allows a user to then manipulate the subsequent distribution of the channels by employing other optical processing equipment. For example, if a user desires to broadcast the two channels that are passed by output waveguides 16 and 18 of FIG. 1, downstream processing equipment may multiplex the two channels into a single wavelength division multiplexed optical signal, which is then transmitted to the various sites of the desired broadcast. The steps of demultiplexing the eight-channel optical signal and multiplexing two of the demultiplexed channels operate well for the intended purpose. However, each operation on an optical carrier imposes some attenuation and potentially introduces noise into the signal. Amplifiers may be used to reduce or eliminate the effects of the attenuation, but the amplification operation is another potential source of signal noise.

What is needed is an optical selector, such as a demultiplexer or sorter, which permits dynamic selections among different combinations of channels to be separated from a wavelength division multiplexed optical signal.

SUMMARY OF THE INVENTION

A channel selection method and apparatus accommodate selective and dynamic rearrangements of optical channels that are passed through parallel waveguides. The optical selection may be implemented in either a multiplexing or a demultiplexing application. In the demultiplexing embodiment, a demultiplexer includes an optical splitter with an input port connected to an input waveguide and N output ports connected to N output waveguides. Each of the N output waveguides has a wavelength-selectable configuration of optical filtering elements. The optical filtering elements of an output waveguide are preferably a series of M Bragg gratings, with at least one and preferably all of the M Bragg gratings being tunable Bragg gratings. The demultiplexer also includes a tuning mechanism that is connected to allow independent manipulation of the tunable Bragg gratings, thereby accommodating the rearrangement of optical channels that propagate through the various output waveguides.

In operation, the demultiplexer receives a wavelength division multiplexed (WDM) optical signal at the input waveguide. The signal is split into N lower energy WDM optical signals at the output ports of the output splitter. The tunable Bragg gratings are manipulated using the tuning mechanism so as to obtain a desired arrangement of optical channels. The preferred embodiment in which all of the Bragg gratings are tunable enables a wide variety of channel arrangements at the outputs of the waveguides, including arrangements in which one or more of the output signals are only partially demultiplexed.

In another embodiment, the optical selection is implemented in a multiplexer application, such as a sorting multiplexer. In this embodiment, a multiplexing coupler includes N input waveguides and a single output waveguide. The multiplexing coupler operates in the inverse to the optical splitter. Each of the N input waveguides includes M Bragg gratings, with at least one and preferably all of the Bragg gratings being tunable with respect to selecting a wavelength band of low transmissivity. A tuning mechanism controls the tunable Bragg gratings to determine which channels of WDM optical signals will pass through the input waveguides to the multiplexing coupler. The channels that pass through the input waveguides determine the condition of signal transmission from the output waveguide.

In both the demultiplexing and multiplexing applications, the preferred embodiment is one in which N=M=number of channels in the WDM signal (i.e., WDM channels). Moreover, the configurations of Bragg gratings on the different waveguides are identical and are all comprised of tunable Bragg gratings. For example, in an application in which a WDM optical signal includes four channels, there are four waveguides that include four series of four tunable Bragg gratings. In the demultiplexing application, the optical splitter divides the WDM optical signal into four lower energy components that are introduced into the four output waveguides. Each of the four tunable Bragg gratings on a particular waveguide is dedicated to park either on or off the target wavelength of one of the four channels. If the channels are designated as channel 1, channel 2, channel 3 and channel 4, there are fifteen alternative outputs for each of the four output waveguides (i.e., four possible single-channel outputs, six possible two-channel outputs, four possible three-channel outputs, and the still fully multiplexed four-channel output).

An advantage of the invention is that the arrays of Bragg gratings enable dynamic manipulation of channels of a WDM optical signal. A single optical selector may be used to partially demultiplex a WDM signal for a first period of time and to then switch to isolating a single channel of the same WDM signal. Such a capability enables selective broadcast of channels to different receiving sites based upon factors such as the time of day. As compared to conventional equipment, the capability is achieved using a single optical selector.

DETAILED DESCRIPTION

Figure 1:
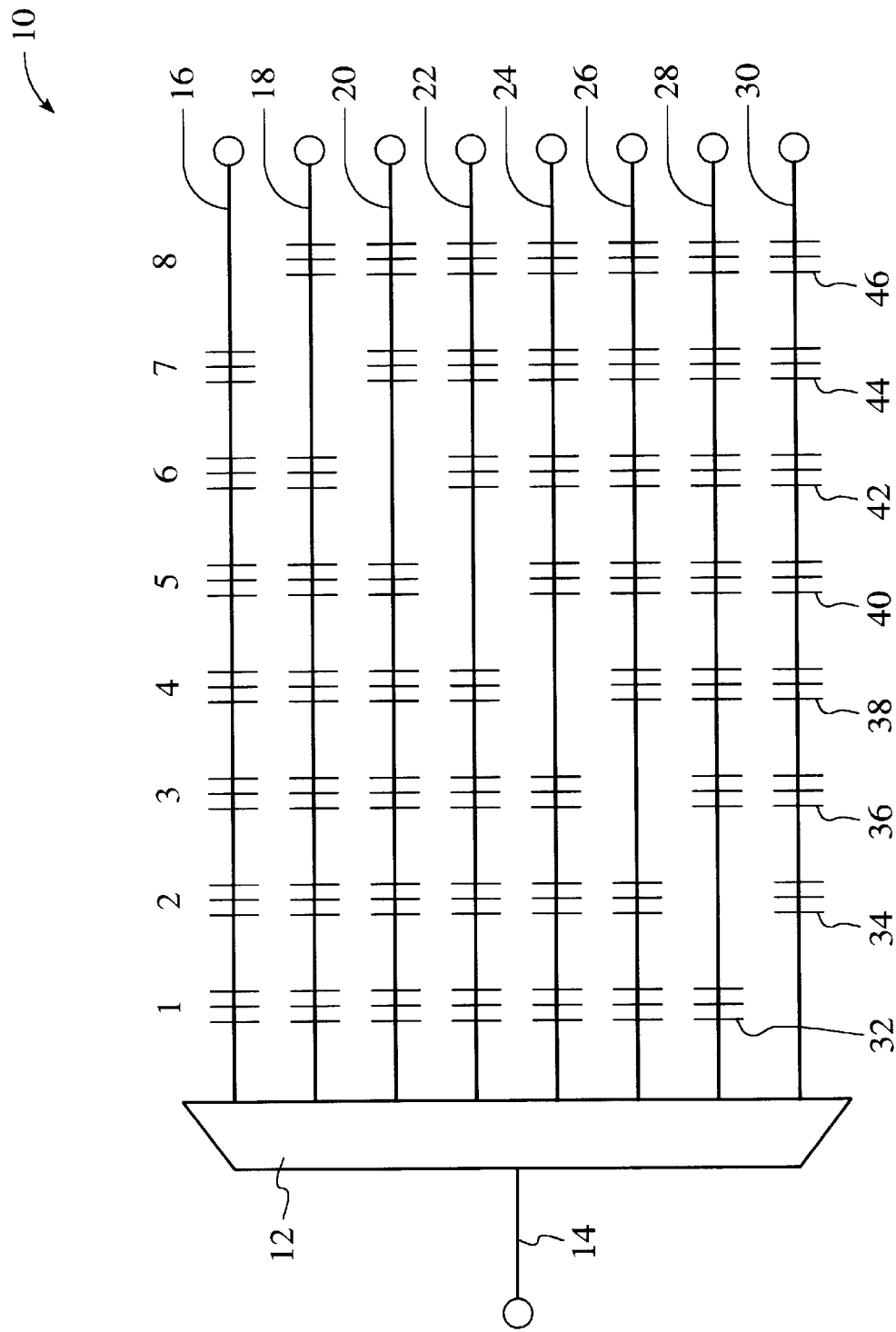
FIG. 1 is a schematic view of a channel demultiplexer having a fixed orientation of isolated channels from output waveguides in accordance with the prior art.
Figure 2:
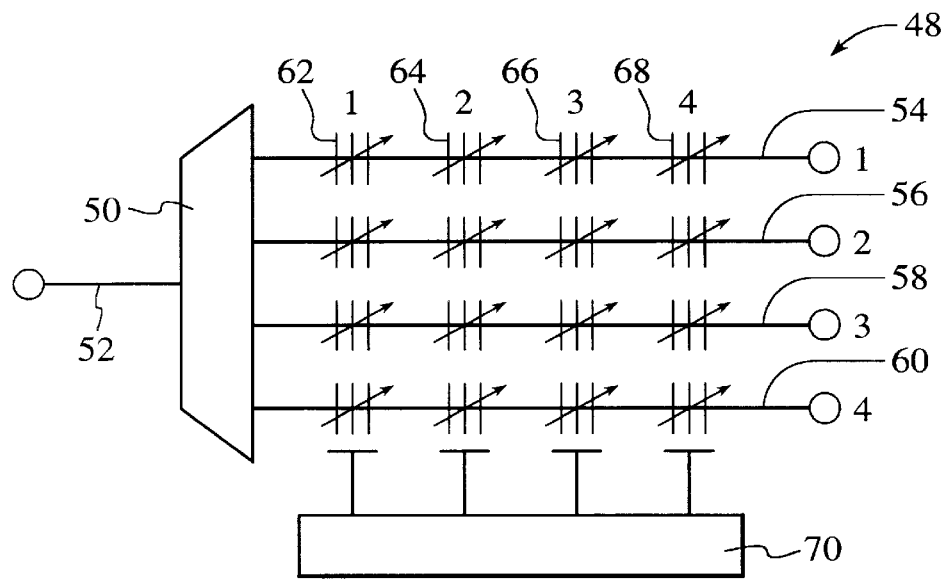
FIG. 2 is a schematic view of a WDM demultiplexer having a wavelength-selectable configuration of four tunable optical filtering elements on each of four output waveguides.

With reference to FIG. 2, a demultiplexer 48 is shown as having an optical splitter 50 that includes an input port connected to an input waveguide 52 and four output ports connected to four output waveguides 54, 56, 58 and 60. In the preferred embodiment, the input and output waveguides are optical fibers, but other devices that provide low-attenuation propagation of optical signals along defined paths may be used. For example, glass which has an ionization pattern that defines waveguides by establishing one or more paths in which the index of refraction has been changed by the ionization may be used as one or more of the waveguides.

The input waveguide 52 may be connected to a source, not shown, of a wavelength division multiplexed (WDM) optical signal. In the preferred embodiment, the number of channels, i.e., optical carriers, of the WDM signal is equal to the number of output waveguides 54–60. The optical splitter 50 may be any device that divides the input WDM signal into four lower energy components that include all of the channels of the input signal. The signal strengths of the four components are generally equal, but this is not critical.

Each of the four output waveguides 54–60 includes a series of tunable optical filtering elements, which are preferably tunable Bragg gratings 62, 64, 66 and 68. As is well known in the art, a Bragg grating is a filtering element that establishes periodic perturbations in refractive index in order to reflect signal energy having a particular wavelength. The demultiplexer 48 of FIG. 2 includes a tuning mechanism 70 that allows the sixteen tunable Bragg gratings to be individually manipulated. The method of tuning the Bragg gratings is not critical to the invention. Thermal tuning and mechanical tuning are available techniques for varying a target wavelength of a tunable Bragg grating. Thermal tuning is accomplished by varying the temperature of the region of the optical fiber that contains the Bragg grating of interest. The periodicity of the perturbations is changed by the thermal expansion of the fiber region. Mechanical tuning is accomplished by varying the stress of the fiber region that contains the Bragg grating of interest, so that the periodicity is affected.

The tuning mechanism 70 is individually coupled to the sixteen tunable Bragg gratings 62, 64, 66 and 68 to allow independent manipulation of the filtering elements. In the preferred embodiment, the four series of Bragg gratings along the four output waveguides 54–60 are generally identical. Each of the four Bragg gratings 62 in the first column may be dedicated to the first channel of the four-channel WDM optical signal from the input waveguide 52. In like manner, each of the four tunable Bragg gratings 64 in the second column may be dedicated to determining passage of a second channel of the WDM signal, each of the Bragg gratings in the third column may be dedicated to determining passage of a third channel, and each of the four Bragg gratings 68 in the fourth column may be dedicated to determining passage of a fourth channel.

Figure 3:
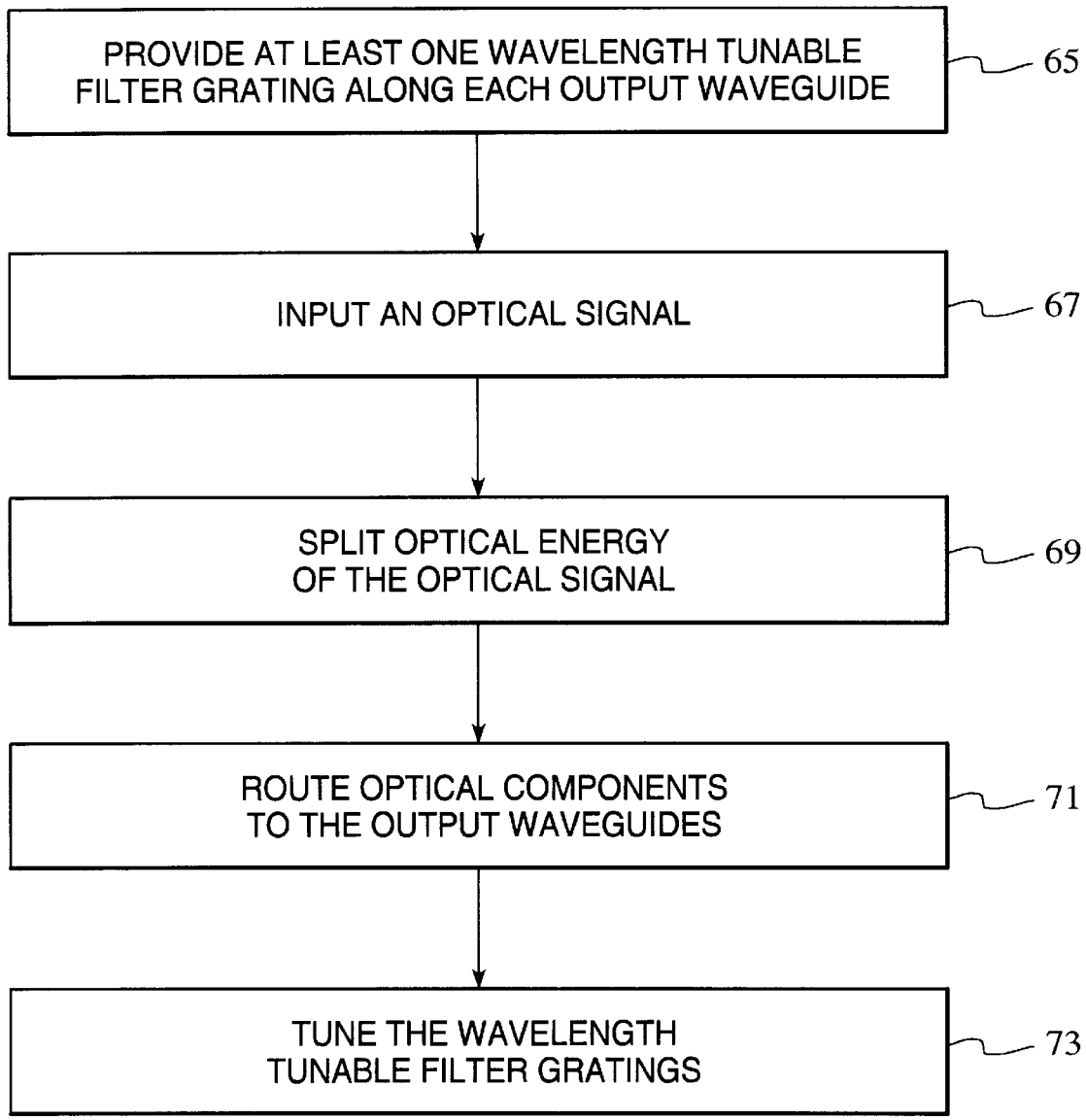
FIG. 3 is a process flow of steps for selecting an arrangement of output signals from the multiplexer of FIG. 2

Referring to FIGS. 2 and 3, in a first step 65, at least one tunable Bragg grating 62, 64, 66 and 68 is provided on each output waveguide 54–60. In step 67, the four-channel WDM optical signal is propagated through the input waveguide 52 to the optical splitter 50. The optical splitter divides the WDM signal 69 into four generally equal signal components that each include the four channels. The four components are routed 71 to the four output waveguides 54–60. The signal that propagates to the end of a particular output waveguide depends upon the conditions of the four Bragg gratings along the waveguide. For example, if the Bragg gratings 62, 64 and 68 along the first output waveguide 54 are tuned 73 to the respective target wavelengths, the first, second and fourth channels will not propagate to the end of the waveguide opposite to the optical splitter 50. On the other hand, if the tuning mechanism 70 locates the third fiber grating off its target wavelength, the third channel of the WDM signal will be output from the first output fiber.

There may be applications in which channels 1 through 4 are to be respectively output from waveguides 1 through 4. In such an application in which the four channels of the WDM optical signal have channel wavelengths of $\lambda_1$, $\lambda_2$, $\lambda_3$ and $\lambda_4$, channel 1 is propagated entirely through the output fiber 54 by parking the first Bragg grating 62 at a wavelength other than the target wavelength $\lambda_1$, while tuning the other Bragg gratings 64, 66 and 68 at channel wavelengths $\lambda_2$, $\lambda_3$ and $\lambda_4$, respectively. The same approach is taken for the other three output waveguides 56–60. For example, the fourth output waveguide 60 has the first three Bragg gratings 62, 64 and 66 parked at the target wavelengths $\lambda_1$, $\lambda_2$ and $\lambda_3$, but the fourth Bragg grating 68 is tuned at a frequency removed from the channel wavelength $\lambda_4$.

An advantage of the demultiplexer 48 of FIG. 2 is that each of the four outputs of the output waveguides 54–60 may be adjusted dynamically. For example, instead of isolating each of the four channels at the outputs of the waveguides 54–60, the Bragg gratings 62, 64, 66 and 68 may be tuned such that channels two and three are output from the first fiber 54, channel two is output from the second fiber 56, channels 1, 2 and 4 are output from the third fiber 58, and no channels are output from the last fiber 60. If a message from the second channel is to be broadcast among all available sites for a set period of time, the tunable Bragg gratings 64 of the second column may all be set to allow passage of the second channel for the set period of time.

Figure 4:
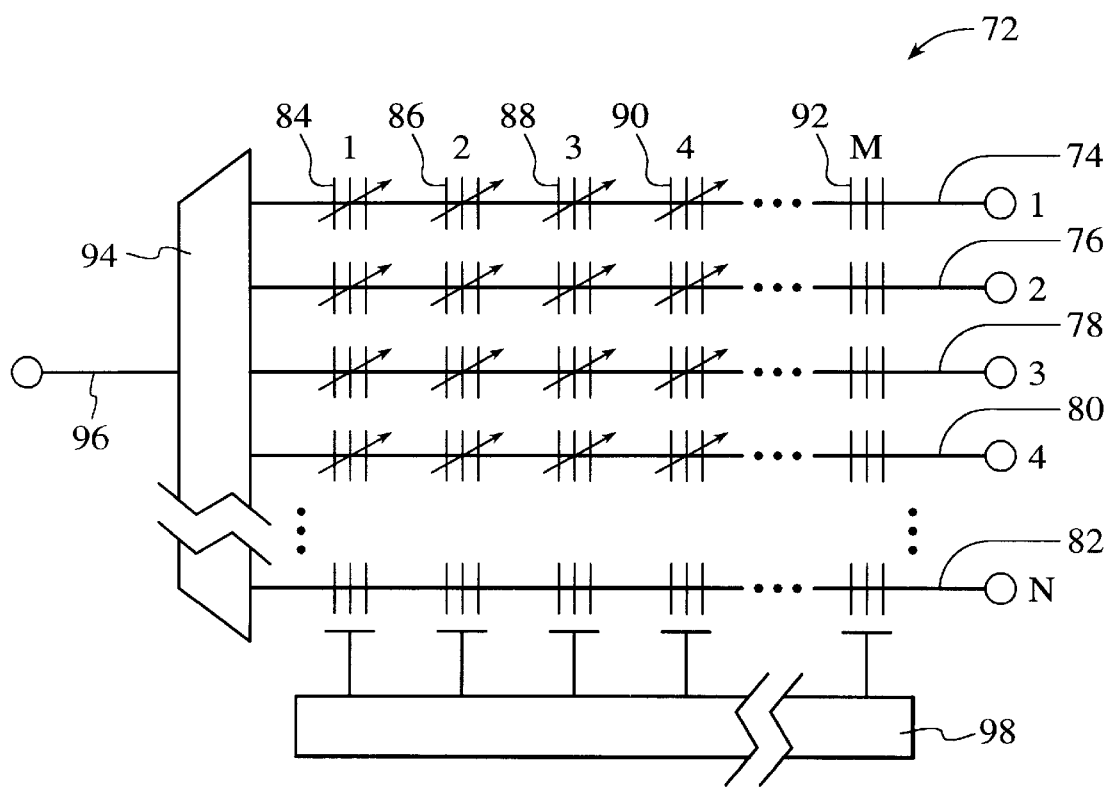
FIG. 4 is a schematic view of a WDM multiplexer having a wavelength-selectable configuration of M tunable Bragg gratings on each of N output waveguides.

The number of output waveguides is not critical to the invention. FIG. 4 illustrates a demultiplexer 72 having N output waveguides 74, 76, 78, 80 and 82, with each waveguide having M tunable Bragg gratings 84, 86, 88, 90 and 92. Each of the M Bragg gratings is dedicated to one of M channels of a WDM optical signal input to a splitter 94 via an input waveguide 96. The tunable Bragg gratings may be parked "on" or "off" target wavelengths by a tuning mechanism 98 that allows individual manipulation of the M×N Bragg gratings.

In the preferred embodiment, N=M=number of channels in the WDM optical signal. In this arrangement, the tunable Bragg gratings may be manipulated to establish a one-to-one correspondence between isolated channels and output waveguides 74–82. However, such a one-to-one correspondence is not critical to the invention. There may be applications in which the desired broadcast of channels varies periodically. The operation of the identical tunable Bragg gratings 84–92 on the various output waveguides 74–82 accommodates dynamic broadcast schemes without requiring multiple devices typically required to partially isolate and partially multiplex channels from a WDM signal.

Figure 5:
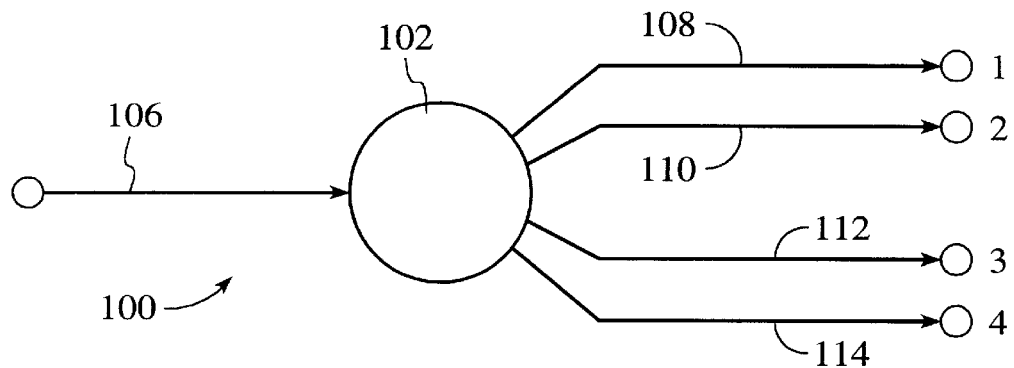
FIG. 5 is a schematic view of a four-channel WDM sorter that incorporates the demultiplexer of FIG. 2

As previously noted, an advantage of the demultiplexer 48 of FIG. 2 is that any one channel or any combination of the four possible channels of the WDM optical signal input via waveguide 52 may be output via any one or all of the four output waveguides 54–60. The demultiplexer, therefore, can be used as a router to take the place of prior routers, which typically require a number of cascaded optical processing devices. That is, the demultiplexer having parallel series of tunable Bragg gratings 62, 64, 66 and 68 reduces the number of devices needed to perform routing functions. A WDM router 100 is shown in FIG. 5. Element 102 represents the beam splitter 50, the tunable Bragg gratings, and the tuning mechanism 70 of FIG. 2. The router 100 receives a four-channel WDM signal via an input fiber 106 and routes any combination of the four channels to four output fibers 108,110,112 and 114. The outputs along the output fibers depend upon the channels that are rejected by the Bragg gratings at element 102. Any or all of the input channels can be routed to any or all of the output fibers in order to achieve wavelength-selectable routing.

Figure 6:
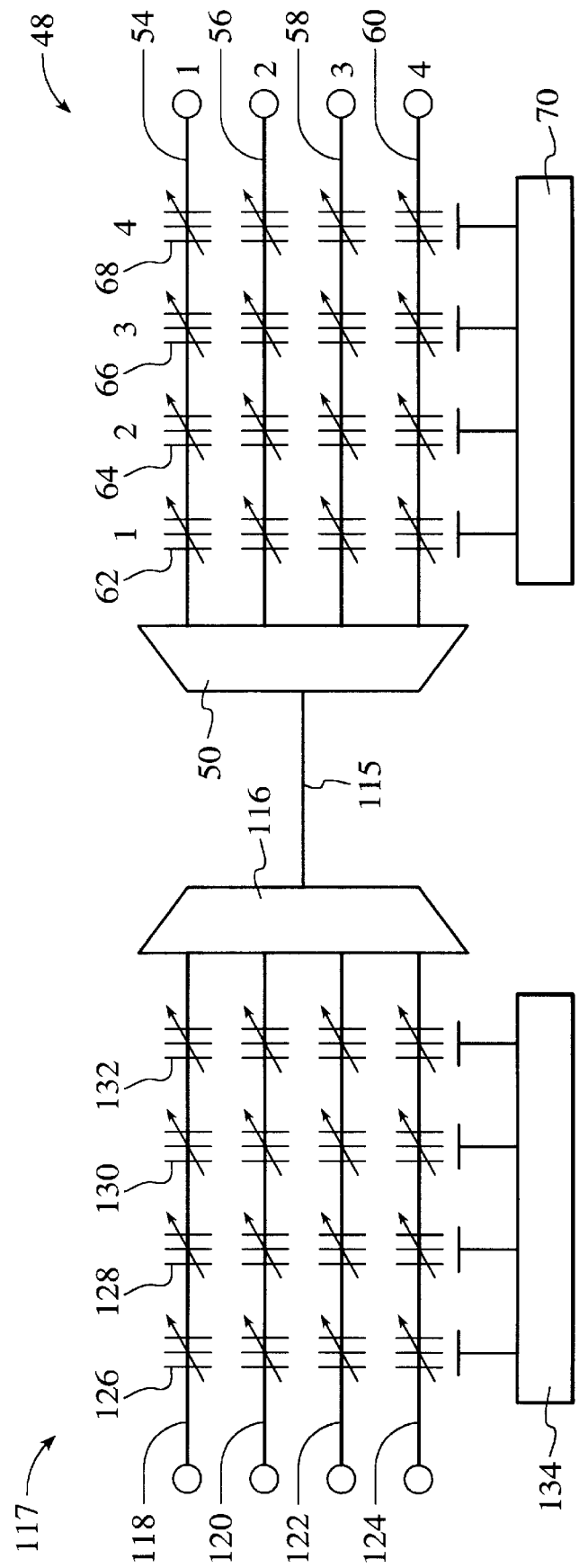
FIG. 6 is a schematic view of a sorter/router using the demultiplexer of FIG. 2.

Referring now to FIG. 6, a WDM sorter/router is shown as incorporating the demultiplexer 48 described with reference to FIG. 2 and a multiplexer 117. Therefore, the reference numerals have been duplicated for the optical splitter 50, the output waveguides 54–60, the tunable Bragg gratings 62–68, and the tuning mechanism 70. A coupling waveguide 115 connects the optical splitter to the multiplexer via a multiplexing coupler 116. The multiplexing coupler operates to form a WDM optical signal comprised of channels received via four input waveguides 118,120, 122 and 124.

Each of the input waveguides 118–124 includes a series of tunable Bragg gratings 126, 128,130 and 132 that may be individually manipulated by a tuning mechanism 134. That is, each of the sixteen Bragg gratings is independently tuned. In many applications, the input Bragg gratings 126–132 are not included, since the input waveguides 118–124 are connected to four different sources of single-channel optical carriers. However, the inclusion of the tunable Bragg gratings increases the capabilities of the WDM sorter/router of FIG. 6. For example, WDM signals may be connected to each of the four input waveguides and the Bragg gratings may be tuned to provide a different configuration of a WDM signal at the coupling waveguide 115. The demultiplexer 48 of the sorter/router may then be used to selectively broadcast the different channels. In such an application, there are advantages to providing more than four Bragg gratings 62, 64, 66 and 68 along each of the output waveguides 54–60. For example, if the WDM signal along the first input waveguide 118 is connected to a WDM optical signal having channels 1 through 4 and the second input waveguide 120 is connected to a source of a WDM optical signal having channels 5 through 8, there are benefits to having eight tunable Bragg gratings along each of the output waveguides 54–60, with each tunable Bragg grating in the series being dedicated to rejecting or passing a particular one of the eight channels.

Figure 7:
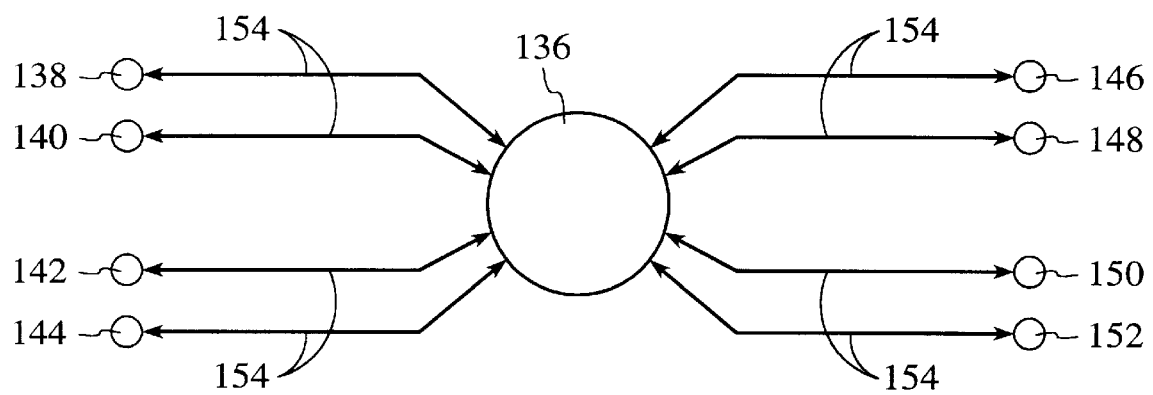
FIG. 7 is a schematic view of a sorter/router system that incorporates the sorter/router of FIG. 6.

Another advantage of having tunable Bragg gratings 126–132 along the input waveguides 118–124 is that the WDM sorter/router may be used bidirectionally if the optical splitter 50 and the multiplexing coupler 116 are configured to provide both operations as a function of the direction of signal propagation. Referring now to FIG. 7, a bidirectional sorter/router 136 acts as a hub for linking a number of sites 138, 140, 142, 144, 146, 148, 150 and 152. The optical connections between the hub and the sites are formed by using bidirectional waveguides, such as optical fibers 154. Comparing FIGS. 6 and 7, each of the waveguides 54–60 and 118–124 of FIG. 6 may be connected to a different bidirectional waveguide 154 of FIG. 7. In operation, selected channels from a WDM signal originating from site 138 may be directed to one or more of the sites 146–152. In the opposite direction, the site 138 is able to receive selected channels originating from sites 146, 148, 150 and 152. Moreover, the site 138 may receive signals from any one of the sites 140, 142 and 144, since the Bragg gratings of FIG. 6 may be used to reflect the channels for reverse propagation. For example, a channel originating at input waveguide 120 of FIG. 6 will propagate forwardly through the coupling waveguide 115 and then rearwardly through the coupling waveguide if the channel is reflected by the appropriately tuned Bragg gratings 62, 64, 66 and 68 along the waveguides of the demultiplexer 48. The rearwardly propagating channel will pass through the coupler 116 and will enter the four waveguides 118–124. The settings of the tunable Bragg gratings 126–132 determine whether the channel will pass through the waveguides.

What is claimed is:

1. An optical selector comprising:

a plurality of bidirectional first optical waveguides, each first optical waveguide having a plurality of first Bragg gratings that are tunable with respect to selectively defining wavelength bands of low transmissivity;

N bidirectional second optical waveguides, N being a number greater than one, said second optical waveguides including generally identical configurations of M second Bragg gratings that are tunable with respect to selectively defining wavelength bands of low transmissivity;

a bidirectional coupler optically coupling said first and second optical waveguides for enabling bidirectional optical transmissions between each of said first optical waveguides and each of said N second optical waveguides; and at least one Bragg grating tuner connected to independently manipulate said tunable first and second Bragg gratings.

2. The optical selector of claim 1 wherein the number of second optical waveguides, N, is equal to the number of second Bragg gratings along each second optical waveguide, M.

3. The optical selector of claim 2 wherein each said first and second optical waveguide is connected to receive a wavelength division multiplexed (WDM) signal having a number of channels equal to N, said coupler being configured to continuously couple each of said first optical waveguides to each of said second optical waveguides.

4. The optical selector of claim 3 wherein each of said M Bragg gratings is tunable and a first said Bragg grating tuner is operatively associated with each of said tunable second Bragg gratings for independently manipulating said tunable second Bragg gratings.

5. The optical selector of claim 1 wherein each said second optical waveguide is connected to a first source of WDM signals having M channels, where M is equal to N, each of said second M Bragg gratings being tunable.

6. The optical selector of claim 5 wherein each said first optical waveguide is connected to a second source of WDM signals having M channels, said at least one Bragg grating tuner being operatively associated with said tunable first and second Bragg gratings for independently manipulating said tunable first and second Bragg gratings.

7. A method for isolating optical carriers in an optical selector having pluralities of first bidirectional waveguides and second bidirectional waveguides comprising the steps of:

providing a plurality of tunable first filter gratings along each first waveguide;

inputting first optical signals having a plurality of optical carriers into first ends of each said first waveguide;

splitting optical energy of said first optical signals at second ends of said first waveguides, thereby forming a plurality of split first optical signals;

routing said split first optical signals into said plurality of second waveguides;

selectively tuning said wavelength tunable first filter gratings such that said routed split first optical signals are a selected arrangement of target optical carriers;

providing a plurality of tunable second filter gratings along each said second waveguide;

inputting second optical signals having a plurality of optical carriers into first ends of said second waveguides;

splitting optical energy of said second optical signals at second ends of said second waveguides, thereby forming a plurality of split second optical signals;

routing said split second optical signals to said plurality of first waveguides; and selectively tuning said tunable second filter gratings such that said routed split second optical signals are a selected arrangement of target optical carriers.

8. The method of claim 7 wherein said step of providing said plurality of tunable first filter gratings along each said first waveguide is a step of providing an identical arrangement of wavelength tunable filter gratings along each of said first waveguides.

9. The method of claim 8 wherein said step of providing said plurality of tunable first filter gratings includes establishing a one-to-one correspondence between said wavelength tunable first filter gratings along each of said first waveguides and said plurality of optical carriers of said first optical signals.

10. The method of claim 7 wherein said step of tuning said wavelength tunable first filter gratings is implemented such that each plurality of first filter gratings passes only one optical carrier of said first plurality of optical carriers.

* * * * *